US012001185B2

(12) United States Patent
Park

(10) Patent No.: US 12,001,185 B2
(45) Date of Patent: Jun. 4, 2024

(54) PLC SYSTEM, AND METHOD FOR CONTROLLING INPUT/OUTPUT REFRESH PERIOD THEREOF

(71) Applicant: LS ELECTRIC CO., LTD., Anyang-si (KR)

(72) Inventor: Chang-Woo Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 371 days.

(21) Appl. No.: 17/603,850

(22) PCT Filed: Mar. 27, 2020

(86) PCT No.: PCT/KR2020/004276
§ 371 (c)(1),
(2) Date: Oct. 14, 2021

(87) PCT Pub. No.: WO2020/213853
PCT Pub. Date: Oct. 22, 2020

(65) Prior Publication Data
US 2022/0236714 A1    Jul. 28, 2022

(30) Foreign Application Priority Data

Apr. 15, 2019   (KR) .................... 10-2019-0043672

(51) Int. Cl.
*G05B 19/05*     (2006.01)
*G05B 19/048*    (2006.01)

(52) U.S. Cl.
CPC ......... *G05B 19/054* (2013.01); *G05B 19/048* (2013.01); *G05B 2219/1105* (2013.01)

(58) Field of Classification Search
CPC .............. G05B 19/054; G05B 19/048; G05B 2219/1105; G05B 19/056; G05B 19/052; G05B 19/058; G05B 19/102
See application file for complete search history.

(56) References Cited

U.S. PATENT DOCUMENTS 7,143,366 B1 * 11/2006 McKelvey ............... G06F 8/71
715/965
8,595,442 B1 * 11/2013 James-Roxby ..... G06F 11/1415
711/131
(Continued)

FOREIGN PATENT DOCUMENTS

JP    H109265306 A    10/1997
JP    2001117608 A     4/2001
(Continued)

OTHER PUBLICATIONS

Office Action for related Japanese Application No. 2021-560921; action dated May 9, 2023; (4 pages).
(Continued)

*Primary Examiner* — Ziaul Karim
(74) *Attorney, Agent, or Firm* — K&L Gates LLP

(57) ABSTRACT

Disclosed are a PLC system, and a method for controlling an input/output refresh period thereof. A PLC system according to an embodiment of the present disclosure comprises: a memory for storing an integrated operation program in which an input/output refresh run command is added and compiled through a program supporter; and a central processing unit which sequentially performs arithmetical processing of a plurality of control programs included in the integrated operation program, to control an operation of a plurality of expansion modules, wherein when arithmetical processing of at least one control program among the plurality of control programs has been completed, the central processing unit outputs processing result data of the at least one control program for which arithmetical processing has been completed, according to an input/output refresh run command which is additionally input.

12 Claims, 7 Drawing Sheets

(56) References Cited

U.S. PATENT DOCUMENTS

| | | | | |
|---|---|---|---|---|
| 8,595,561 B1* | 11/2013 | Lu | ................... | G01R 31/31705 |
| | | | | 714/45 |
| 2006/0253626 A1* | 11/2006 | Ueno | ................... | G05B 19/058 |
| | | | | 710/62 |
| 2009/0037872 A1* | 2/2009 | Schnabele | .......... | G05B 19/4183 |
| | | | | 717/105 |
| 2012/0106695 A1 | 5/2012 | Fan et al. | | |
| 2012/0170709 A1 | 7/2012 | Fan et al. | | |
| 2017/0068236 A1* | 3/2017 | Iname | ................. | G05B 19/054 |

FOREIGN PATENT DOCUMENTS

| | | | |
|---|---|---|---|
| JP | 2007257077 | A | 10/2007 |
| JP | 2011215821 | A | 10/2011 |
| JP | 2011231698 | A | 11/2011 |
| JP | 2012096021 | A | 5/2012 |
| JP | 2016110458 | A | 6/2016 |
| KR | 20100125752 | A | 12/2010 |
| KR | 20160141938 | A | 12/2016 |
| KR | 101782252 | B1 | 9/2017 |

OTHER PUBLICATIONS

International Search Report for related International Application No. PCT/KR2020/004276; report dated Oct. 22, 2020; (5 pages).
Written Opinion for related International Application No. PCT/KR2020/004276; report dated Oct. 22, 2020; (4 pages).
Office Action for related Japanese Application No. 2021-560921; action dated Nov. 29, 2022; (3 pages).

* cited by examiner

PLC SYSTEM, AND METHOD FOR CONTROLLING INPUT/OUTPUT REFRESH PERIOD THEREOF

CROSS-REFERENCE TO RELATED APPLICATIONS

This application is the National Stage filing under 35 U.S.C. 371 of International Application No. PCT/KR2020/004276, filed on Mar. 27, 2020, which claims the benefit of earlier filing date and right of priority to Korea utility model Application No. 10-2019-0043672 filed on Apr. 15, 2019, the contents of which are all hereby incorporated by reference herein in their entirety.

FIELD

The present disclosure relates to a PLC (Programmable Logic Controller) system which may extract and obtain processing result data of at least one extension module while a PLC controls operations of multiple extension modules, and a method for controlling an input/output refresh period thereof.

BACKGROUND

A PLC refers to a controller that uses digital/analog input/output modules to control individual modules (e.g., extension modules) according to a predefined control sequence.

The PLC provides services of various functions for controlling at least one extension module. These PLC services are processed based on an operating system (OS) mounted on a central processing unit of the PLC. In this connection, the central processing unit of the PLC may be composed of an MPU (Micro Processor Unit) including at least one microprocessor, etc.

The PLC may allow program instructions written by a user with PADT (Programming and Debugging Tool), for example, instructions such as LD (Ladder Diagram), IL (Instruction List), SFC (Sequential Function Chart), FBD (Function Block Diagram), ST (Structured Text), and a ladder program to be compiled, and to be stored in a memory in a corresponding manner to each of extension module control programs. Then, each extension module operates according to instructions generated as a result of each control program computing executed in the central processing unit.

FIG. 1 is a sequence diagram showing a PLC service processing process according to a prior art.

Referring to FIG. 1, first, the central processing unit of the PLC performs initialization such as resetting an input/output module, self-diagnosis, clearing data, and registering the input/output module according to the compiled control program in S1.

Next, before starting computing and command control according to each control program, the central processing unit executes an input image area refresh operation of reading operation preparation state information of the input modules (or extension modules) connected thereto via input/output ports, respectively, and storing the information in an input image area in S2.

Then, the central processing unit performs a control program processing process of performing computing and command control in sequence from a start step to a last step of the control programs, based on states of the input modules connected thereto in S3. In this connection, a processing result according to the control programs is stored in an output image area. The central processing unit performs an output image area refresh operation of outputting the result data stored in the output image area to each output module in S4.

Finally, after terminating a PLC service process of one cycle, the central processing unit performs END processing such as self-diagnosis, timer and counter update, data transmission, etc. to return to the step S2 in S5.

The conventional PLC performs the output image area refresh operation S4 only at the timing of terminating the PLC service processing of one cycle, and then performs the input image area refresh operation S1 again. Thus, there is a problem that the processing result data for each extension module may not be obtained in real time during the computing and command control period S3 according to the control programs.

In other words, in the prior art, in order to operate a plurality of extension modules using one PLC, a plurality of control programs are input and compiled to control a plurality of extension modules using PADT, and the compiled control programs are executed to perform the PLC service operation. However, there is a problem that the processing result data may not be extracted and identified based on each control program for one cycle in which all of the control programs are computed in sequence.

SUMMARY

The present disclosure is intended to solve the above problem. A purpose of the present disclosure is to provide a PLC system that may support additional inputting of an input/output refresh execution command for periods in which execution of at least one control program has been completed, in a process of inputting each of control programs to control multiple extension modules using one PLC, and to provide a method for controlling an input/output refresh period thereof.

Further, a purpose of the present disclosure is to provide a PLC system that allows an additional input/output refresh operation to be performed for at least one control program completion period, in aa process of operating multiple extension modules according to multiple input control programs, thereby extracting and obtaining processing result data for at least one control program, and to provide a method for controlling an input/output refresh period thereof.

Further, a purpose of the present disclosure is to provide a PLC system which compares a result data of execution of each control program as extracted during a previous cycle period with a result data of execution of each control program as extracted at a current cycle period, in a process of additionally performing an input/output refresh operation, and thus determines whether to perform the input/output refresh operation based on the comparison result, and to provide a method for controlling an input/output refresh period thereof.

Purposes of the present disclosure are not limited to the above-mentioned purpose. Other purposes and advantages of the present disclosure that are not mentioned above may be understood based on following descriptions, and will be more clearly understood with reference to embodiments of the present disclosure. Further, it will be readily apparent that the purposes and advantages of the present disclosure may be realized using means and combinations thereof indicated in the Claims.

In order to achieve the purposes, one aspect of the present disclosure provides a programmable logic controller (PLC) system for controlling an input/output refresh period, the system comprising: a memory for storing therein an integrated operation program, wherein the integrated operation program is compiled such that an input/output refresh execution command is added thereto using a program supporter; and a central processing unit configured to sequentially compute a plurality of control programs included in the integrated operation program to control operations of a plurality of extension modules, wherein the central processing unit is configured to: when computing of at least one control program among the plurality of control programs has been completed, output result data of execution of at least one control program on which the computing has been completed based on the added input/output refresh execution command.

The program supporter includes: a code input program supporter for supporting a user to design and input the integrated operation program including a plurality of input/output refresh execution commands, and for supporting a PADT (Programming and Debugging Tool) display program to set the integrated operation program such that the integrated operation program is repeatedly executed; and a PADT compiler for compiling the integrated operation program including the plurality of input/output refresh execution commands, and providing the integrated operation program to the memory and the central processing unit.

The integrated operation program is configured such that a start and initialization instruction, an input refresh command, a plurality of control programs, and an output refresh command are sequentially arranged therein, wherein the integrated operation program is further configured such that the input/output refresh command is disposed between adjacent control programs of the plurality of control programs.

When the central processing unit reads the added input/output refresh execution command after executing and computing of at least one control program has been completed in a process of sequentially computing the plurality of control programs, the central processing unit is configured to sequentially perform an output refresh operation of outputting result data of the executing and computing of the at least one control program, and an input refresh operation, wherein when the central processing unit reads a next control program, the central processing unit is configured to execute the next control program.

When the central processing unit executes the integrated operation program in a first cycle, and then, repeatedly executes the integrated operation program in next cycles, the central processing unit is configured to: sequentially compare result data of execution of the integrated operation program in a previous cycle with result data of execution of the integrated operation program in a current cycle; reduce an amount of an input/output refresh operation process in the current cycle compared to an amount of an input/output refresh operation process in the previous cycle, based on the comparing result; and perform the input/output refresh operation in the current cycle using the reduced amount.

The PLC system further comprises: an input port for transmitting operation state information of each of the extension modules to the central processing unit; and an output port for transmitting result data of execution of each of the control programs to each of the extension modules.

In order to achieve the purposes, another aspect of the present disclosure provides a method of controlling an input/output refresh period of a PLC system, the method comprising: storing an integrated operation program in a memory, wherein the integrated operation program is compiled such that an input/output refresh execution command is added thereto using a program supporter; and sequentially computing, by a central processing unit, a plurality of control programs included in the integrated operation program to control operations of a plurality of extension modules.

Sequentially computing, by the central processing unit, the plurality of control programs includes: when computing of at least one control program among the plurality of control programs has been completed, outputting result data of execution of at least one control program on which the computing has been completed based on the added input/output refresh execution command.

Storing the integrated operation program the memory includes: supporting a user to design and input the integrated operation program including a plurality of input/output refresh execution commands, and supporting a PADT (Programming and Debugging Tool) display program to set the integrated operation program such that the integrated operation program is repeatedly executed; and compiling the integrated operation program including the plurality of input/output refresh execution commands, and providing the integrated operation program to the memory and the central processing unit.

The integrated operation program is configured such that a start and initialization instruction, an input refresh command, a plurality of control programs, and an output refresh command are sequentially arranged therein, wherein the integrated operation program is further configured such that the input/output refresh command is disposed between adjacent control programs of the plurality of control programs.

Outputting the result data of execution of the at least one control program on which the computing has been completed includes: upon reading the added input/output refresh execution command after executing and computing of at least one control program has been completed in a process of sequentially computing the plurality of control programs, sequentially performing, by the central processing unit, an output refresh operation of outputting result data of the executing and computing of the at least one control program, and an input refresh operation; and upon reading a next control program, executing, by the central processing unit, the next control program.

Outputting the result data of execution of the at least one control program on which the computing has been completed includes: when the central processing unit executes the integrated operation program in a first cycle, and then, repeatedly executes the integrated operation program in next cycles, sequentially comparing, by the central processing unit, result data of execution of the integrated operation program in a previous cycle with result data of execution of the integrated operation program in a current cycle; reducing, by the central processing unit, an amount of an input/output refresh operation process in the current cycle compared to an amount of an input/output refresh operation process in the previous cycle, based on the comparing result; and performing, by the central processing unit, the input/output refresh operation in the current cycle using the reduced amount.

The method further comprises: transmitting operation state information of each of the extension modules to the central processing unit; and transmitting result data of execution of each of the control programs to each of the extension modules.

The PLC system and the method for controlling the input/output refresh period thereof according to an embodiment of the present disclosure having various technical features as described above allow controlling the multiple of extension modules using one PLC, so that application efficiency and management efficiency of the PLC system may be improved.

Further, the PLC system according to an embodiment of the present disclosure having various technical features as described above may support the additional inputting of the input/output refresh execution command such that the input/output refresh operation is additionally performed for a period when execution of at least one control program has been completed, in the process of inputting the plurality of control programs so that the plurality of extension modules may be controlled using one PLC.

Thus, the PLC system according to the present disclosure may allow the input/output refresh operation to be additionally performed at a timing at which execution of at least one control program has been completed, in a process of operating the multiple extension modules using one PLC, thereby extracting and obtaining the processing result data of the executed at least one control program. This may increase management efficiency and convenience of a user, and furthermore, may increase reliability.

Further, the PLC system according to the present disclosure may compare the result data of execution of each control program as extracted in the previous cycle period with the result data of execution of each control program as extracted in the current cycle period, in a process of additionally performing the input/output refresh operation, and thus determines whether to perform the input/output refresh operation based on the comparison result. This may minimize an effect resulting from increase in a processing speed and a processing period due to additionally performing the input/output refresh operation.

DETAILED DESCRIPTION

Figure 1:
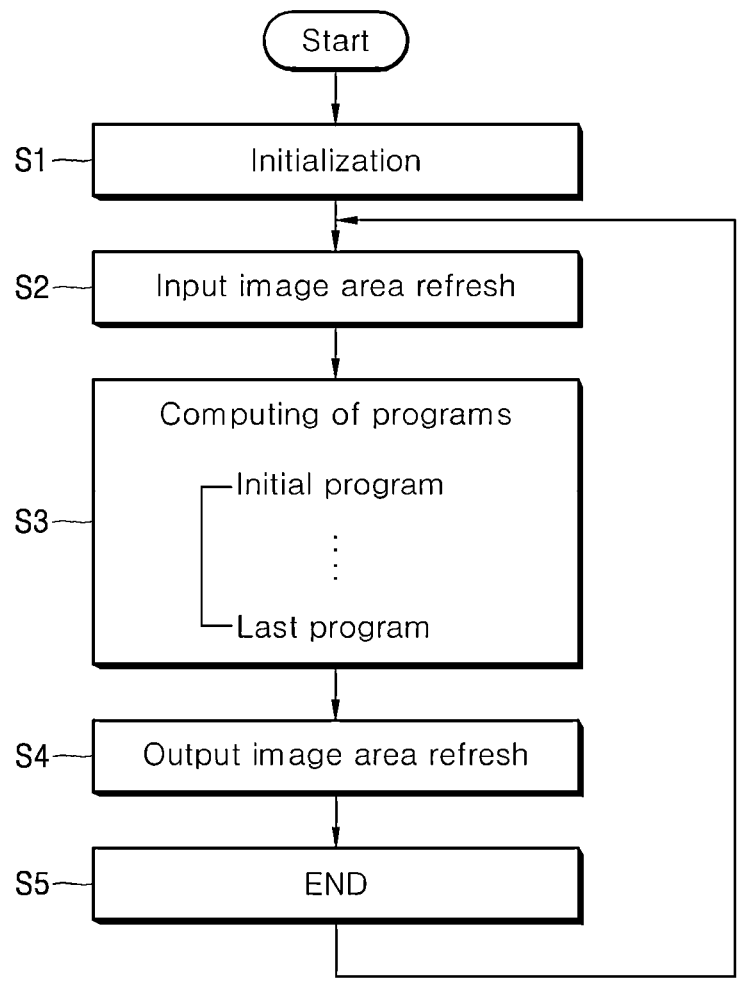
FIG. 1 is a sequence diagram showing a PLC service processing process according to the prior art.

The terms or words used in the present specification and claims should not be construed as being limited to conventional or dictionary meanings. Rather, based on the principle that the inventor may appropriately define a concept of a term to describe the present disclosure in the best way, the terms or words used in the present specification and claims should be interpreted as a meaning and concept consistent with the technical idea of the present disclosure. Further, an embodiment described in this specification and a configuration shown in the drawings are only one the most preferred embodiment of the present disclosure and does not represent all the technical ideas of the present disclosure. Thus, it should be understood that there may be various equivalents and modifications thereto and thereof at a time of filling the present application.

Hereinafter, a PLC system and a method for controlling an input/output refresh period thereof according to an embodiment of the present disclosure will be described in detail with reference to the accompanying drawings.

Figure 2:
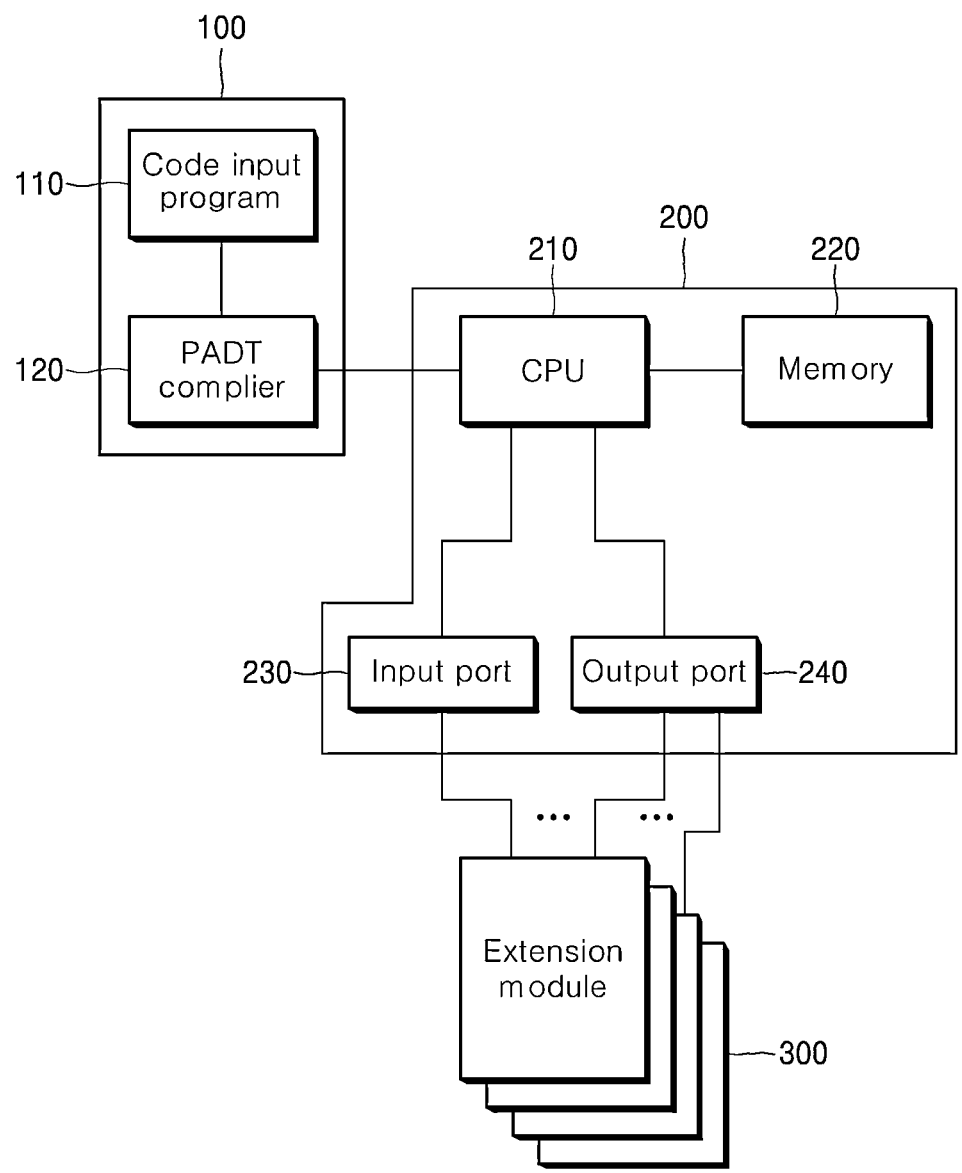
FIG. 2 is a configuration block diagram specifically showing a PLC system according to an embodiment of the present disclosure.

FIG. 2 is a configuration block diagram specifically showing a PLC system according to an embodiment of the present disclosure.

The PLC system shown in FIG. 2 includes a memory 220 which stores therein an integrated operation program as complied in a state in which an input/output refresh execution command is added thereto via the program supporter 100, a central processing unit 210 that sequentially computes a plurality of control programs included in the integrated operation program to control operations of a plurality of extension modules 300, an input port 230 for transmitting operation state information of each of the extension modules 300 to the central processing unit 210, and an output port 240 for transmitting each result data of each control program processing to each of the extension modules 300.

The program supporter 100 supports a PADT (Programming and Debugging Tool) display program so that the user may preset a control sequence and control operations of the PLC 200 that controls the plurality of extension modules 300.

The program supporter 100 includes a code input program supporter 110, and a PADT compiler 120. In this connection, the code input program supporter 110 supports PADT display program such that the user includes a plurality of input/output refresh execution commands therein to design and input the integrated operation program on at least one cycle basis.

Specifically, the program supporter 100 supports the user to design and input the integrated operation program that allows the PLC 200 to operate and control the plurality of extension modules 300 on at least one cycle basis. The program supporter 100 supports the PADT display program so that the user may design and input the integrated operation program. In this connection, the program supporter 100 supports an input/output refresh execution command addition menu and code to allow adding the input/output refresh execution command on at least one control program basis, in a process in which the user sets and inputs the plurality of control programs included in the integrated operation program.

Thus, the user may execute the PADT display program on a terminal device such as a personal computer or notebook computer, and may write instructions and execution codes using a menu bar, a tool bar and an execution window of the PADT display program, and thus may design the integrated operation program to allow operating and controlling the plurality of extension modules 300 on at least one cycle basis.

When designing the integrated operation program, the user may separately write and set the control programs for respectively controlling the extension modules 300 using a menu selection function. Thus, the user may add an input/output refresh execution command at a completion timing of at least one control program computing, using the input/output refresh execution command addition menu and selection code, in the process of inputting and setting the control programs on at least one control program basis. The input/output refresh execution command addition support screen and addition method will be described later in more detail with reference to the accompanying drawings.

The PADT compiler 120 compiles an integrated operation program in which an input/output refresh execution command is added to at least one control program, that is, an integrated operation program including a plurality of input/output refresh execution commands, according to a user's compilation command. Then, the compiled integrated operation program is provided to the memory 220 and the central processing unit 210.

The memory 220 stores therein the integrated operation program compiled by the PADT compiler 120, and shares the integrated operation program with the central processing unit 210. Further, the memory 220 stores therein the operation state information of each of the extension modules 300 input via the input port 230 and shares the operation state information with the central processing unit 210. Then, the memory 220 may store therein each result data of each control program processing executed by the central processing unit 210 and share the result data with the central processing unit 210 according to the request of the central processing unit 210.

The central processing unit 210 computes the integrated operation program compiled by the PADT compiler 120 on each control program basis, and controls an operation of each extension module 300 according to each control program-specific computing result data.

In particular, when computing of at least one control program has been completed while the central processing unit 210 computes each of a plurality of control programs, the central processing unit 210 executes an input/output refresh operation according to an additionally inputted input/output refresh execution command. Then, the central processing unit 210 outputs the processing result data of at least one control program on which the input/output refresh operation has been completed to the output port 240 and the memory 220.

More specifically, when the central processing unit 210 had read a start command and an initialization command of the compiled integrated operation program, the central processing unit 210 performs initialization such as resetting each extension module 300 and the input/output ports 230 and 240, self-diagnosis, clearing previous data, registering an input/output code for each extension module 300, and registering a data input/output pin.

Then, the central processing unit 210 reads an operation preparation state information about the plurality of extension modules 300 respectively connected thereto via the input/output ports 230 and 240 before executing the plurality of control programs in sequence. Then, the central processing unit 210 performs an input refresh operation of storing each operation preparation state information in an image area set for each of the extension modules 300.

Then, the central processing unit 210 executes and computes a first control program for controlling an operation of at least one extension module among the plurality of extension modules 300, and thus calculates and stores first result data for controlling the operation of at least one extension module among the plurality of extension modules 300. In this connection, when the input/output refresh execution command is read at a timing when the computing of the first control program has been completed, an output refresh operation of outputting the first result data may be performed, and an input refresh operation may be performed again.

However, when a second control program is read in a state in which the input/output refresh execution command is not written and read, the central processing unit 210 executes and computes the second control program for controlling the operation of at least one extension module among the plurality of extension modules 300. Then, when second result data for controlling the operation of at least one extension module among the plurality of extension modules 300 is calculated, the central processing unit 210 stores the second result data. In this connection, when the input/output refresh execution command is read at a timing when the computing of the second control program has been completed, the central processing unit 210 may perform an output refresh operation of outputting both the first and second result data, and then perform an input refresh operation again.

To the contrary, when a third control program is read while the input/output refresh execution command is not written and read even after the computing of the second control program has been completed, the central processing unit 210 executes and computes the third control program for controlling the operation of at least one extension module among the plurality of extension modules 300. Then, when the third result data for controlling the operation of at least one extension module among the plurality of extension modules 300 is calculated, the third result data is stored. Subsequently, when the input/output refresh execution command is read at a timing when the computing of the third control program has been completed, the central processing unit 210 performs an output refresh operation of outputting all of the first to third result data. Then, the input refresh operation may be performed again. The above-described integrated operation program execution and computing process is performed for one cycle from the initialization process to a process of performing the output refresh operation of outputting all of the first to third result data.

When the central processing unit 210 executes the integrated operation program again in a second cycle after the central processing unit 210 executes the integrated program for one cycle from the initialization process to the process of performing the output refresh operation of outputting all of the first to third result data, the central processing unit 210 sequentially compares the result data of the execution of the integrated operation program in the previous first cycle with the result data of the execution of the integrated operation program in the current cycle. Thus, the central processing unit 210 may perform the input/output refresh operation while reducing an amount of the input/output refresh operation process in the current cycle compared to the input/output refresh operation process in the previous cycle.

Specifically, when the central processing unit 210 performs the input/output refresh operation with starting from a timing when the central processing unit 210 executes the integrated operation program in the second cycle after executing the integrated operation program in the first cycle, the central processing unit 210 compares the result data of execution of each control program as extracted in the previous cycle period with the result data of execution of each control program as extracted in the current cycle period. Then, when the result data of the execution of the control program in the previous cycle (for example, the first cycle of the execution of the integrated operation program) is the same as the result data of the execution of the control program in the current cycle (for example, the second cycle thereof), the central processing unit 210 outputs only the same result data for the control programs having the same result data. At this time, the central processing unit 210 may stop the input/output refresh operation and may execute a next control program. This integrated operation program execution and computing method as performed by the central processing unit 210 will be described later in more detail with reference to the accompanying drawings.

Figure 3:
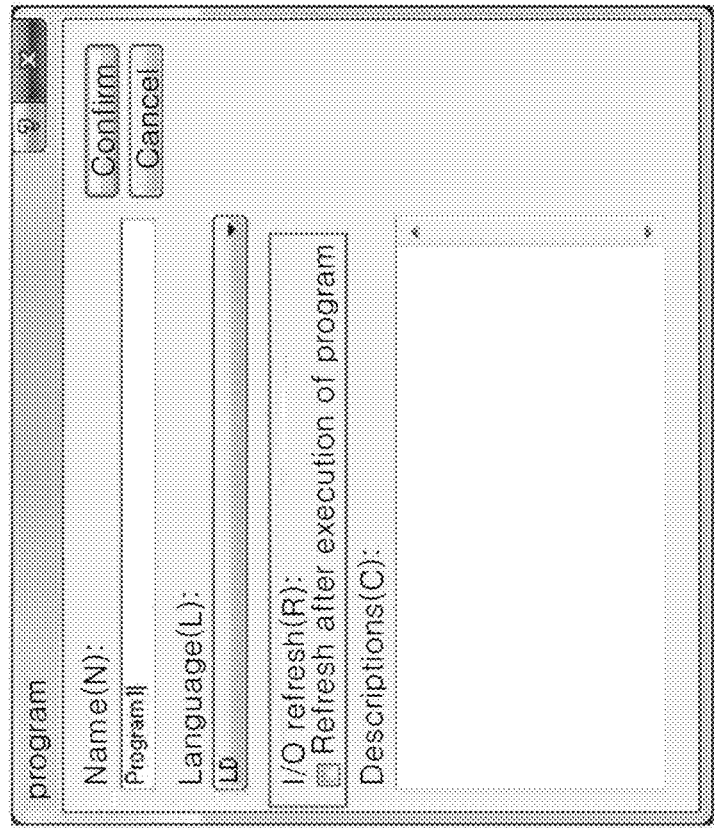
FIG. 3 is a view showing an input/output refresh addition setting screen of PADT supported by a program supporter shown in FIG. 1.
Figure 3:
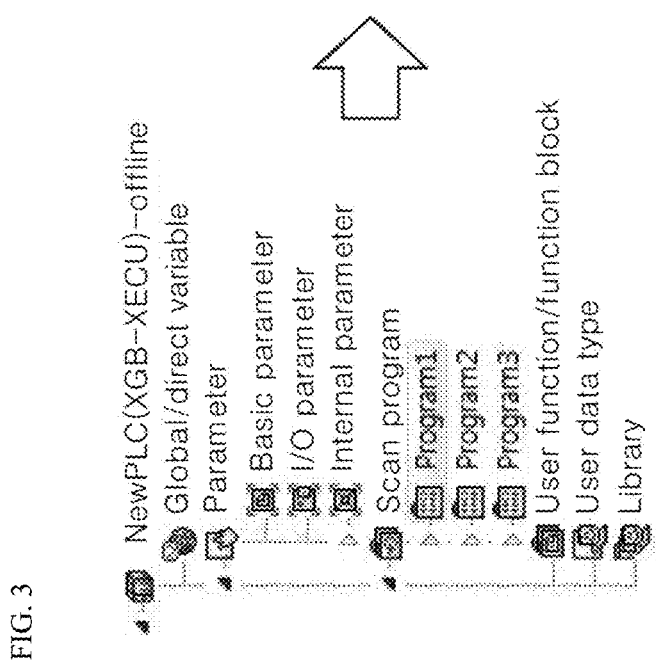

FIG. 3 is a view showing the input/output refresh addition setting screen of PADT supported by the program supporter shown in FIG. 1.

Referring to FIG. 3, the input/output refresh command addition input support method is described as follows.

That is, the program supporter 100 supports the user to execute the PADT display program using a terminal device such as a personal computer or a notebook computer. In this connection, the program supporter 100 supports the user to add and select each of control programs Program1 to Program1 in sequence using the menu bar of the PADT display program. Then, when the user selects one of the control programs Program 1 to Program 3 on the menu bar, the program supporter 100 supports an option selection toolbar that allows the user to selectively add an input/output refresh command to one selected control program Program1. Thus, the user may select an input/output refresh command addition option for each of the controls program Program1 to Program1.

Figure 4:
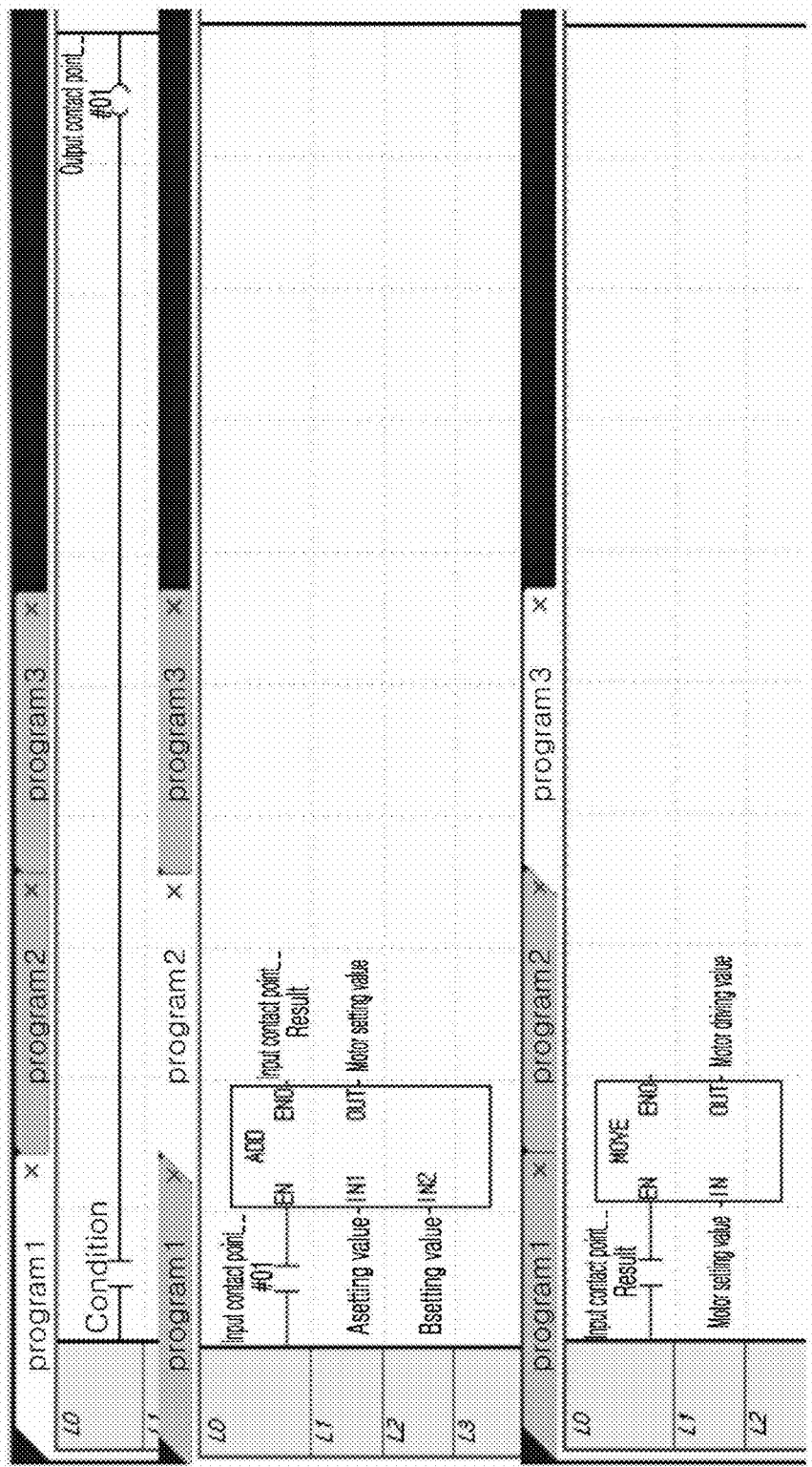
FIG. 4 is a view showing a control program input and setting screen of PADT shown in FIG. 3.

FIG. 4 is a view showing a control program input and setting screen of PADT shown in FIG. 3.

As shown in FIG. 4, when the user selects one of the control programs Program1 to Program3 and selects whether to add the input/output refresh command thereto and identifies the selection result, the program supporter 100 provides an execution window, a menu bar, and a tool bar to allow the user to design and set the selected one of the control programs Program1 to Program3.

Thus, the user may write instructions and execution codes using the execution window, the menu bar, and the toolbar of the PADT display program to design each of the control programs Program1 to Program3 on at least one cycle basis.

Figure 5:
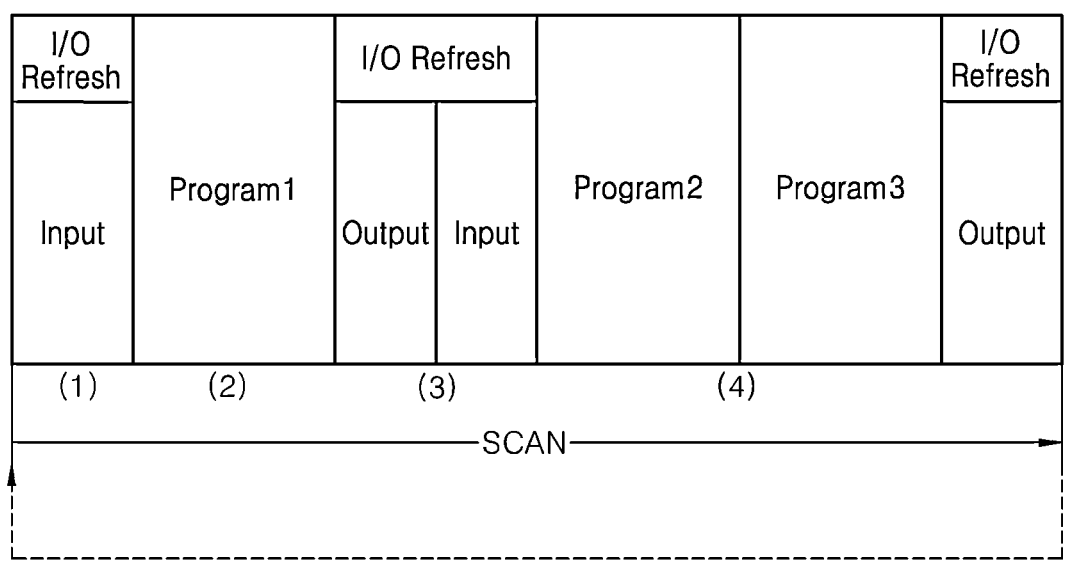
FIG. 5 is a diagram showing an integrated operation program processing sequence and an arrangement structure of extension modules set and stored in a memory and a central processing unit of FIG. 2.

FIG. 5 is a diagram showing an integrated operation program processing sequence and an arrangement structure of the extension modules set and stored in the memory and the central processing unit of FIG. 2.

Referring to FIG. 5, a start command and an initialization instruction, and an input/output refresh command (or an input refresh command) and a first control program Program1 are arranged in the integrated operation program in this sequence. An input/output refresh command (I/O Refresh) may be additionally arranged after the first control program Program1.

At least one program, for example, the second and third control programs Program1 and Program3 may be arranged, in sequence, after the first control program Program1 or the input/output refresh command (I/O Refresh). In this connection, an input/output refresh command (I/O Refresh) may be additionally disposed between the second and third control programs Program2 and Program3. In this way, the plurality of control programs and the input/output refresh commands (I/O Refresh) may be arranged based on the extension modules 300, and thereafter, an output refresh command (I/O Refresh) may be arranged. Thus, an operation of one cycle may be completed.

Figure 6:
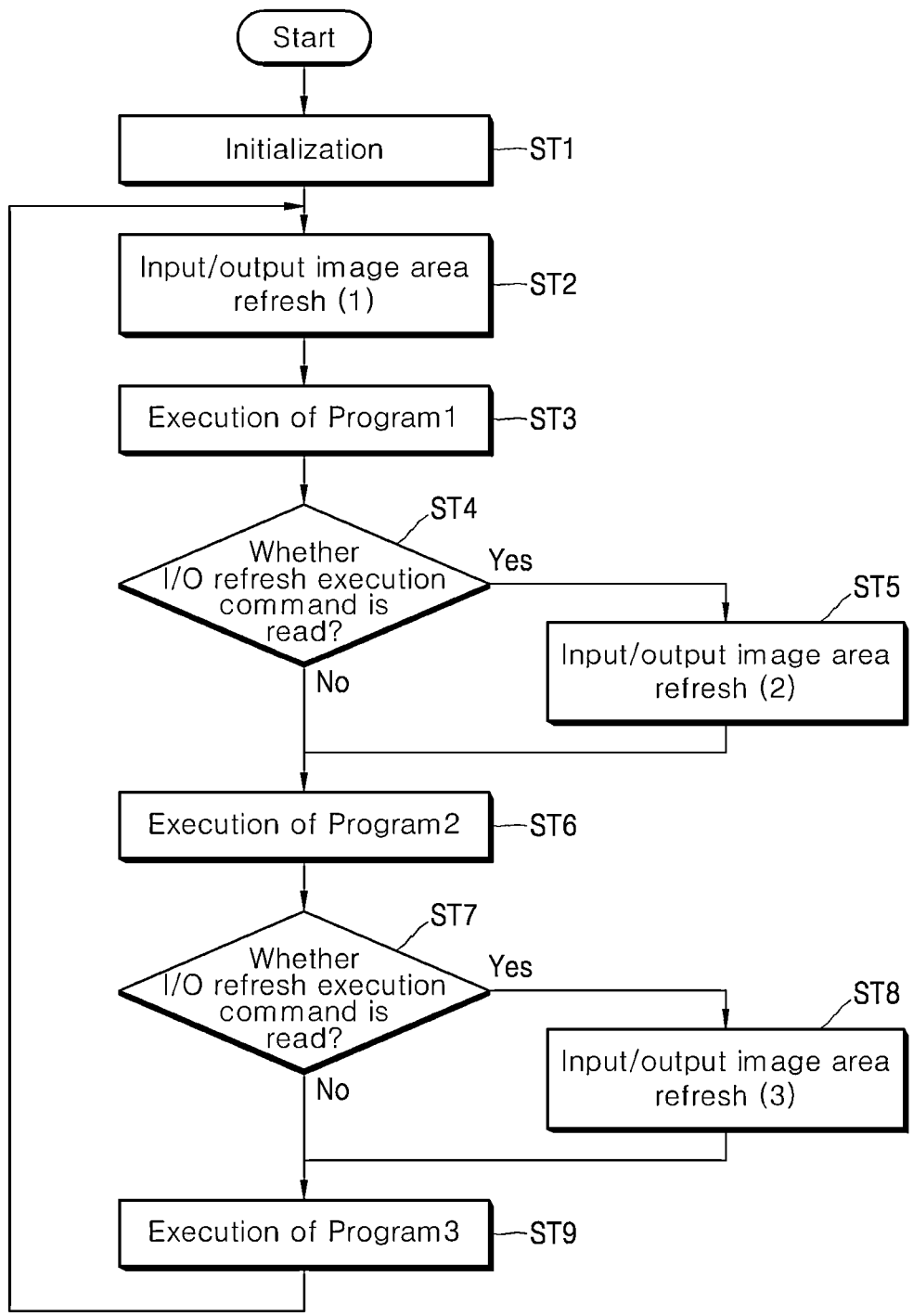
FIG. 6 is a sequence diagram for illustrating an integrated operation program processing method of a PLC system according to an embodiment of the present disclosure.

FIG. 6 is a sequence diagram for illustrating an integrated operation program processing method as performed by the PLC system according to an embodiment of the present disclosure.

Referring to FIG. 5 and FIG. 6, a sequential description of the execution and processing process of the compiled integrated operation program is as follows.

First, when the central processing unit 210 reads the start command and the initialization command of the compiled integrated operation program, the central processing unit 210 performs the initialization such as resetting each extension module 300 and the input/output ports 230 and 240, self-diagnosis, clearing previous data, registering input/output codes for each extension module 300, and registering data input/output pins in ST1. The initialization result data is stored in the memory 220.

Then, before the central processing unit 210 executes the plurality of control programs Program1 to Program3 in sequence according to the input/output refresh command (I/O Refresh), the central processing unit 210 reads the operation state information about the plurality of extension modules 300 respectively connected thereto via the input/output ports 230 and 240. Then, the central processing unit 210 sets an input image area for each extension module 300, and performs an input refresh operation of storing each operation preparation state information in the set image area in ST2.

Next, the central processing unit 210 executes and computes the first control program Program1 for selectively controlling the operation of at least one extension module among the plurality of extension modules 300, and calculates and stores the first result data for controlling the operation of at least one extension module among the plurality of extension modules 300 in ST3. In this connection, when the input/output refresh execution command is read in ST4 at the timing when the computing of the first control program Program1 has been completed, the central processing unit 210 sets an output image area for storing therein the first result data and performs an output refresh operation of storing the first result data in the output image area and outputting the first result data to the output port 240 and the memory 220. Then, the central processing unit 210 may set the input image area again and may perform an input refresh operation of storing each operation preparation state information in the set input image area in ST5. Thus, the memory 220 stores therein the first result data. Thereafter, when a sharing request from the central processing unit 210 is made, the memory 220 may transmit the first result data to the central processing unit 210.

Subsequently, when the second control program Program1 for operating at least one extension module among the plurality of extension modules 300 is read after the input/output refresh operation has been executed, the central processing unit 210 may execute and compute the second control program to selectively controls the operation of at least one extension module among the plurality of extension modules 300 in ST6. Then, when the second result data for controlling the operation of at least one extension module is calculated, the second result data is stored in the memory. In this connection, when the input/output refresh execution command is read in ST7 at the timing when the computing of the second control program has been completed, the central processing unit 210 performs an output refresh operation of outputting both the first and second result data to the output port 240 and the memory 220, and may perform the input refresh operation again in ST8.

Then, when the third control program Program3 is read after the input/output refresh operation has been executed, the central processing unit 210 executes and computes the third control program Program3 for selectively controlling the operation of at least one extension module among the plurality of extension modules 300. Then, when the third result data for controlling at least one extension module operation is calculated, the third result data is stored in the memory. Subsequently, when the input/output refresh execution command is read at the timing when the computing of the third control program has been completed, the central processing unit 210 may perform an output refresh operation of outputting all of the first to third result data to the output port 240 and the memory 220, and then perform the input refresh operation again. The above-mentioned integrated operation program execution and computing process is repeatedly performed for at least one cycle.

Figure 7:
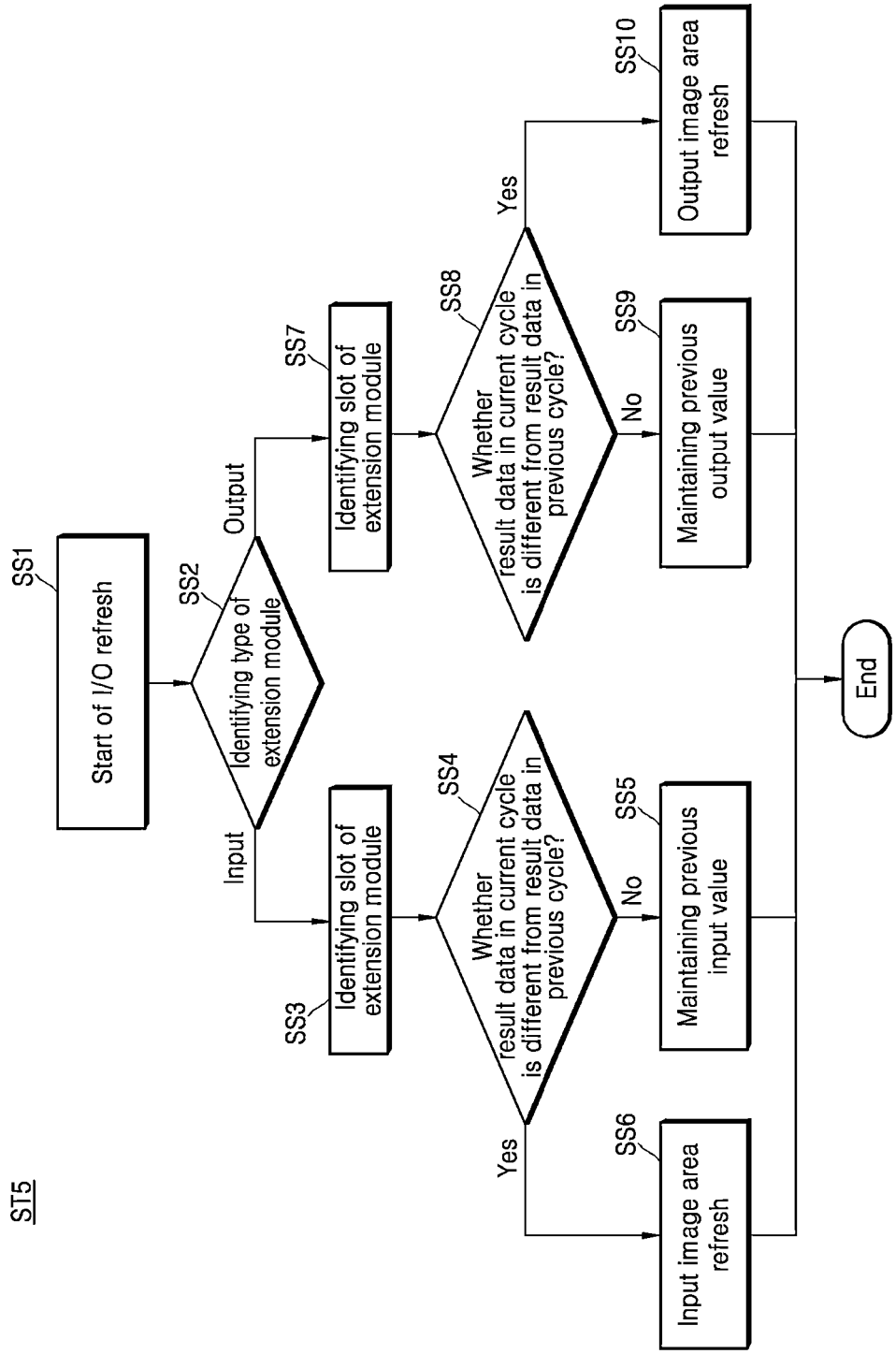
FIG. 7 is a sequence diagram to more specifically illustrate a process of performing input/output refresh shown in FIG. 6.

FIG. 7 is a sequence diagram to more specifically illustrate the process of performing input/output refresh shown in FIG. 6.

As described above, when the integrated operation program is executed again in next plurality of cycles after performing the integrated operation program in the first cycle, the central processing unit 210 sequentially compares the result data of the execution of the integrated operation program in the previous cycle, for example, the first cycle with the result data of the execution of the integrated operation program in the current cycle, for example, the second cycle. This may reduce the input/output refresh operation process in the current cycle compared to the input/output refresh operation process of the previous cycle to perform the input/output refresh operation.

Specifically, referring to FIG. 7, a more detailed description of the method of performing the input/output refresh operation while reducing an amount of the input/output refresh operation process is as follows.

When the central processing unit 210 executes the integrated operation program in the first cycle and then executes the integrated operation program in next plurality of cycles again, the central processing unit 210 identifies an input/output type of a corresponding extension module, for example, the first extension module, according to the input/output refresh command in SS1 and SS2.

When the first extension module is of an input type, the central processing unit 210 identifies an input slot of the first extension module in SS3, and compares the first result data of execution of the first control program as extracted in the previous cycle period with the first result data of execution of the first control program as extracted at the current cycle period in SS4. Then, when the first result data of execution of the first control program in the process of the previous cycle is the same as the first result data of execution of the control program in the current cycle, the central processing unit 210 outputs only the same first result data regarding the first control program having the same result data but stops the input/output refresh operation and executes a next control program in SS5.

To the contrary, only when the result data of execution of the control program in the previous cycle is different from the result data of execution of the control program in the current cycle, the central processing unit 210 sets the output image area for storing therein the first result data and performs an output refresh operation of storing the first result data in the output image area and outputting the first result data to the output port 240 and the memory 220. Then, the central processing unit 210 sets the input image area again and performs an input refresh operation of storing each operation preparation state information in the set image area in ST6.

When, based on the result of identifying the input/output type of the first extension module, the first extension module has the output type, the central processing unit 210 identifies an output slot of the first extension module in SS7. Then, the central processing unit 210 compares the first result data of execution of the first control program as extracted in the previous cycle period with the first result data of execution of the first control program as extracted at the current cycle period in SS8. Then, when the first result data of execution of the first control program in the process of the previous cycle is the same as the first result data of execution of the control program in the process of the current cycle, the central processing unit outputs only the same first result data regarding the first control program having the same result data, but stops the input/output refresh operation and executes a next control program in SS9.

To the contrary, only when the result data of execution of the control program in the previous cycle is different from the result data of execution of the control program in the current cycle, the central processing unit sets the output image area for storing the first result data therein and performs an output refresh operation of storing the first result data in the output image area and outputting the first result data to the output port 240 and the memory 220. Then, the central processing unit again sets the input image area and performs an input refresh operation of storing each operation preparation state information in the set image area in ST10.

As described above, the PLC system and the method for controlling the input/output refresh period thereof according to an embodiment of the present disclosure having various technical features as described above allow controlling the multiple of extension modules using one PLC, so that application efficiency and management efficiency of the PLC system may be improved.

Further, the PLC system according to an embodiment of the present disclosure having various technical features as described above may support the additional inputting of the input/output refresh execution command such that the input/output refresh operation is additionally performed for a period when execution of at least one control program has been completed, in the process of inputting the plurality of control programs so that the plurality of extension modules may be controlled using one PLC.

Thus, the PLC system according to the present disclosure may allow the input/output refresh operation to be additionally performed at a timing at which execution of at least one control program has been completed, in a process of operating the multiple extension modules using one PLC, thereby extracting and obtaining the processing result data of the executed at least one control program. This may increase management efficiency and convenience of a user, and furthermore, may increase reliability.

Further, the PLC system according to the present disclosure may compare the result data of execution of each control program as extracted in the previous cycle period with the result data of execution of each control program as extracted in the current cycle period, in a process of additionally performing the input/output refresh operation, and thus determines whether to perform the input/output refresh operation based on the comparison result. This may minimize an effect resulting from increase in a processing speed and a processing period due to additionally performing the input/output refresh operation.

It is to be understood that the above-described embodiment is illustrative in all respects and not restrictive, and the scope of the present disclosure will be indicated by the following claims rather than the foregoing detailed description. Not only the meaning and scope of the claims to be described later, but also all changes and modifications derived from the equivalent concept should be construed as being included in the scope of the present disclosure.

What is claimed is:

1. A programmable logic controller (PLC) system for controlling an input/output refresh period, the system comprising:
   a memory for storing therein an integrated operation program, wherein the integrated operation program is compiled such that an input/output refresh execution command is added thereto using a program supporter; and
   a central processing unit configured to sequentially compute a plurality of control programs included in the integrated operation program to control operations of a plurality of extension modules,
   wherein the central processing unit is configured to:
      when computing of at least one control program among the plurality of control programs has been completed, output result data of execution of at least one control program on which the computing has been completed based on the added input/output refresh execution command,
      when at least one control program among the plurality of control programs is completed, check whether the input/output refresh execution command is set,
      when the input/output refresh execution command is set, compare data on an operation state information of each extension modules input from an input port with the result data of execution of the at least one control program,
      when the data on the operation state information of the each extension modules and the result data of execution of the at least one control program are different, perform an input/output refresh, and
      when the data on the operation state information of the each extension modules and the result data of execution of the at least one control program are the same, execute a next control program without executing the input/output refresh.

2. The PLC system of claim 1, wherein the program supporter includes:
   a code input program supporter for supporting a user to design and input the integrated operation program including a plurality of input/output refresh execution commands, and for supporting a PADT (Programming and Debugging Tool) display program to set the integrated operation program such that the integrated operation program is repeatedly executed; and
   a PADT compiler for compiling the integrated operation program including the plurality of input/output refresh execution commands, and providing the integrated operation program to the memory and the central processing unit.

3. The PLC system of claim 1, wherein the integrated operation program is configured such that a start and initialization instruction, an input refresh command, a plurality of control programs, and an output refresh command are sequentially arranged therein,
   wherein the integrated operation program is further configured such that the input/output refresh command is disposed between adjacent control programs of the plurality of control programs.

4. The PLC system of claim 3, wherein when the central processing unit reads the added input/output refresh execution command after executing and computing of at least one control program has been completed in a process of sequentially computing the plurality of control programs, the central processing unit is configured to sequentially perform an output refresh operation of outputting result data of the executing and computing of the at least one control program, and an input refresh operation,
   wherein when the central processing unit reads a next control program, the central processing unit is configured to execute the next control program.

5. The PLC system of claim 4, wherein when the central processing unit executes the integrated operation program in a first cycle, and then, repeatedly executes the integrated operation program in next cycles,
   the central processing unit is configured to:
      sequentially compare result data of execution of the integrated operation program in a previous cycle with result data of execution of the integrated operation program in a current cycle;
      reduce an amount of an input/output refresh operation process in the current cycle compared to an amount of an input/output refresh operation process in the previous cycle, based on the comparing result; and
      perform the input/output refresh operation in the current cycle using the reduced amount.

6. The PLC system of claim 1, wherein the PLC system further comprises:
   an input port for transmitting operation state information of each of the extension modules to the central processing unit; and
   an output port for transmitting result data of execution of each of the control programs to each of the extension modules.

7. A method of controlling an input/output refresh period of a PLC system, the method comprising:
   storing an integrated operation program in a memory, wherein the integrated operation program is compiled such that an input/output refresh execution command is added thereto using a program supporter; and
   sequentially computing, by a central processing unit, a plurality of control programs included in the integrated operation program to control operations of a plurality of extension modules,
   wherein sequentially computing, by the central processing unit, the plurality of control programs includes:
      when computing of at least one control program among the plurality of control programs has been completed, outputting result data of execution of at least one control program on which the computing has been completed based on the added input/output refresh execution command,
      when at least one control program among the plurality of control programs is completed, checking whether the input/output refresh execution command is set,
      when the input/output refresh execution command is set, comparing data on an operation state information of each extension modules input from an input port with the result data of execution of the at least one control program,
      when the data on the operation state information of the each extension modules and the result data of execution of the at least one control program are different, performing an input/output refresh, and
      when the data on the operation state information of the each extension modules and the result data of execution of the at least one control program are the same, executing a next control program without executing the input/output refresh.

8. The method of claim 7, wherein storing the integrated operation program the memory includes:

supporting a user to design and input the integrated operation program including a plurality of input/output refresh execution commands, and supporting a PADT (Programming and Debugging Tool) display program to set the integrated operation program such that the integrated operation program is repeatedly executed; and compiling the integrated operation program including the plurality of input/output refresh execution commands, and providing the integrated operation program to the memory and the central processing unit.

9. The method of claim 7, wherein the integrated operation program is configured such that a start and initialization instruction, an input refresh command, a plurality of control programs, and an output refresh command are sequentially arranged therein, wherein the integrated operation program is further configured such that the input/output refresh command is disposed between adjacent control programs of the plurality of control programs.

10. The method of claim 9, wherein outputting the result data of execution of the at least one control program on which the computing has been completed includes:

upon reading the added input/output refresh execution command after executing and computing of at least one control program has been completed in a process of sequentially computing the plurality of control programs, sequentially performing, by the central processing unit, an output refresh operation of outputting result data of the executing and computing of the at least one control program, and an input refresh operation; and upon reading a next control program, executing, by the central processing unit, the next control program.

11. The method of claim 10, wherein outputting the result data of execution of the at least one control program on which the computing has been completed includes:

when the central processing unit executes the integrated operation program in a first cycle, and then, repeatedly executes the integrated operation program in next cycles, sequentially comparing, by the central processing unit, result data of execution of the integrated operation program in a previous cycle with result data of execution of the integrated operation program in a current cycle;

reducing, by the central processing unit, an amount of an input/output refresh operation process in the current cycle compared to an amount of an input/output refresh operation process in the previous cycle, based on the comparing result; and performing, by the central processing unit, the input/output refresh operation in the current cycle using the reduced amount.

12. The method of claim 7, wherein the method further comprises:

transmitting operation state information of each of the extension modules to the central processing unit; and transmitting result data of execution of each of the control programs to each of the extension modules.

* * * * *